D. W. BOVEE.
Hay Raker and Loader.
No. 209,156. Patented Oct. 22, 1878.
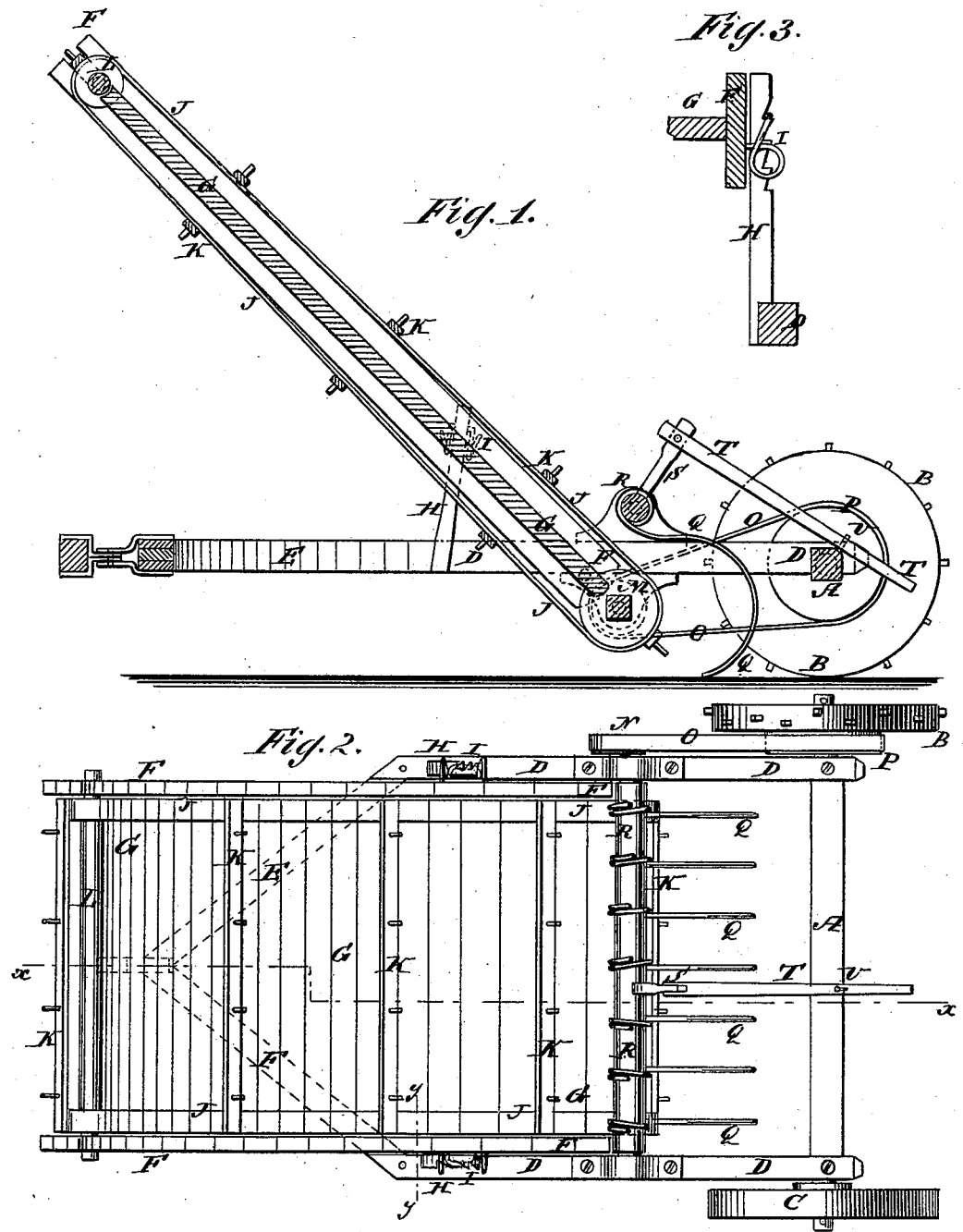

UNITED STATES PATENT OFFICE.

DAVID W. BOVEE, OF RICHLAND CENTRE, WISCONSIN.

IMPROVEMENT IN HAY RAKER AND LOADER.

Specification forming part of Letters Patent No. 209,156, dated October 22, 1878; application filed May 5, 1877.

*To all whom it may concern:*

Be it known that I, DAVID WILLIAM BOVEE, of Richland Centre, in the county of Richland and State of Wisconsin, have invented certain new and useful Improvements on Hay Rake and Loader; and I do hereby declare the following to be a full, clear, and exact description thereof, reference being had to the accompanying drawing, and to the letters of reference marked thereon.

My invention relates to that class of hay rakes and loaders which are provided with an adjustable elevator; and the nature of my invention consists in combining with the main frame and elevator notched arms pivoted to the main frame, and coiled spring-wire catches fastened to the elevator and passed over the arms, to engage with the notches thereon, for holding the elevator in any position desired, and at the same time allow the elevator to yield to any sudden or unusual strain, as will be hereinafter more fully set forth.

In order to enable others skilled in the art to which my invention appertains to make and use the same, I will now proceed to describe its construction and operation, referring to the annexed drawing, which forms a part of this specification, and in which—

Figure 1 is a longitudinal section on the line $x\ x$, Fig. 2, of a hay rake and loader embodying my invention. Fig. 2 is a plan view of the same; and Fig. 3 is a detail section taken through the line $y\ y$, Fig. 2.

A represents the axle, with driving-wheels B C on its ends. D E is the main frame, secured to the axle, and provided at the front end with a clevis or similar device, for connecting the same to the rear end of a wagon.

F G is the elevator-frame, provided with top and bottom rollers, L M, over which pass the endless belts J, connected by a series of toothed bars, K, to form the elevator. The elevator is pivoted at or near its lower end in the main frame, at a point a suitable distance in front of the axle A, and it is operated by a belt, O, from a pulley, P, attached to or formed upon the drive-wheel B, and passing around a pulley, N, on one of the journals of the lower roller, M.

The elevator is supported at any angle desired by two standards, H, the lower ends of which are pivoted to the main frame. These standards are notched upon the outer sides, and pass through wire keepers I, attached to the elevator-frame. The arms of the wire keepers are bent into coils, so that the said keepers may act as spring-catches to enter the notches of the standards H and support the elevator at any desired inclination. These wire keepers or catches I I also act for another very important purpose. They, being made of spring-wire, allow the elevator to yield to any sudden or unusual strain or jerking of the operating parts, and thus relieve the same from the shock that would otherwise be occasioned.

Between the axle and the lower part of the elevator is situated a rocking shaft or roller, R, to which the rake-teeth Q are attached. This arm is provided with an arm, S, to the end of which is pivoted a lever, T, said lever passing back over the axle A, for operating the rake-teeth. The teeth are locked in place by placing the lever T over a pin, V, on the axle, as shown.

I am fully aware that the elevators in hay-loaders have been made adjustable by various means; but in such cases as known to me the elevator, in whatever position adjusted, has always been held rigid, whereas in my invention, by the construction of the wire catches, a certain amount of flexibility is imparted to the elevator without in the least rendering the elevator liable to become detached from its supports.

Having thus fully described my invention, what I claim as new, and desire to secure by Letters Patent, is—

The combination, in a hay rake and loader, with the main frame D E and elevator F G, of the notched arms H, pivoted to the frame, and the coiled spring-wire catches I, fastened to the elevator, arranged to pass over the arms H, and by spring-pressure take into the notches thereon, and thus prevent any accidental displacement of the elevator, and at the same time impart a certain degree of flexibility or elasticity to the elevator, substantially as herein set forth.

DAVID WILLIAM BOVEE.

Witnesses:
WM. H. PALMER,
ELISHA BOVEE.